Jan. 3, 1956 R. R. KELLER 2,728,957
MOULDINGS FOR PANEL MEMBERS, AND THE LIKE
Filed June 3, 1953 3 Sheets-Sheet 2
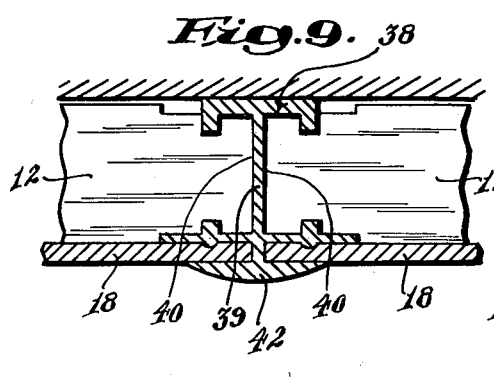
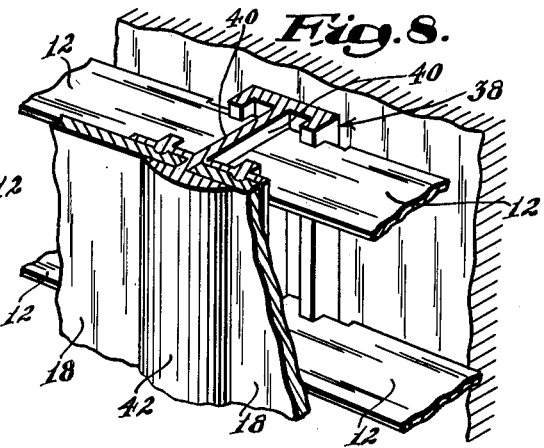
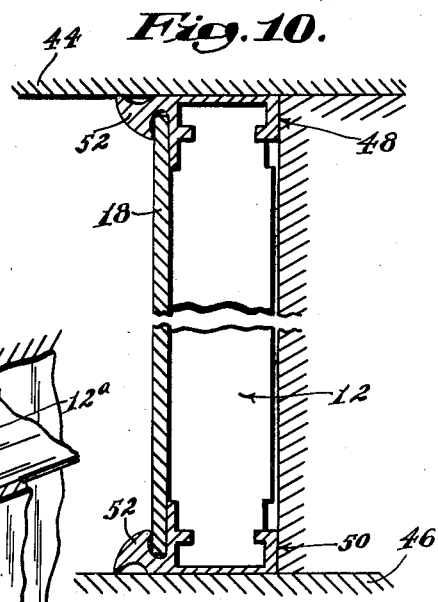
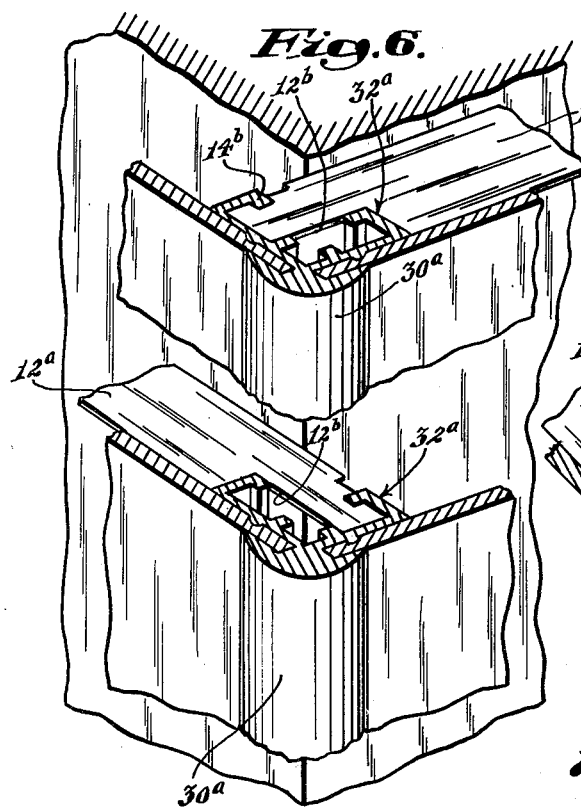
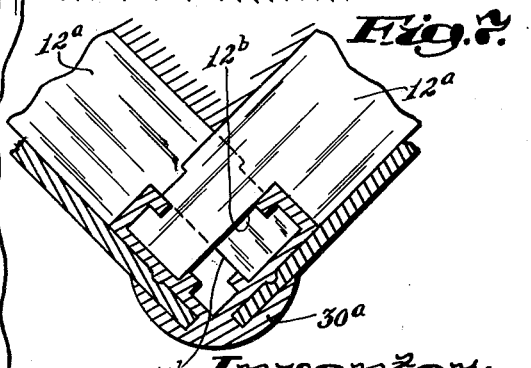

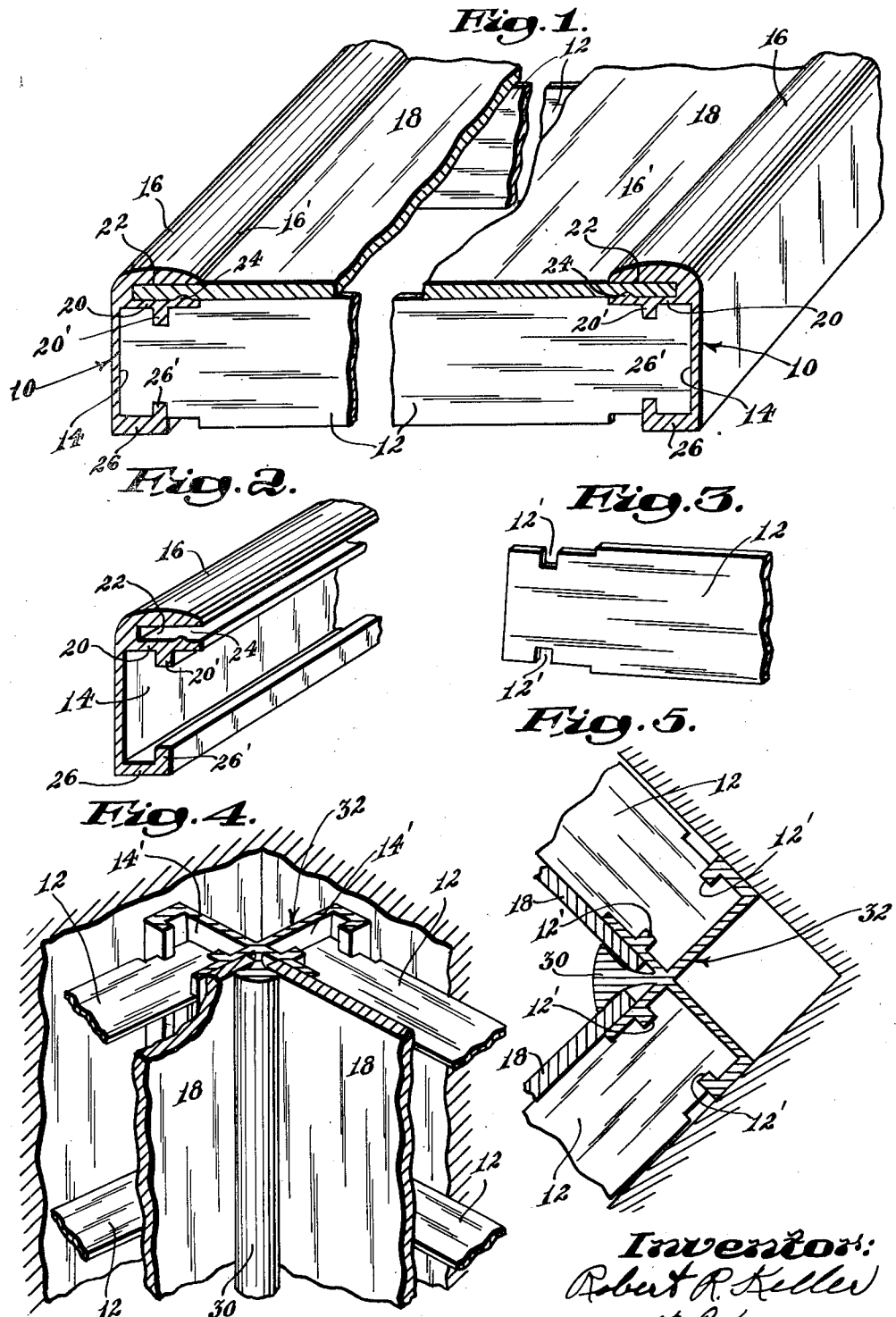

Jan. 3, 1956  R. R. KELLER  2,728,957
MOULDINGS FOR PANEL MEMBERS, AND THE LIKE
Filed June 3, 1953  3 Sheets—Sheet 3
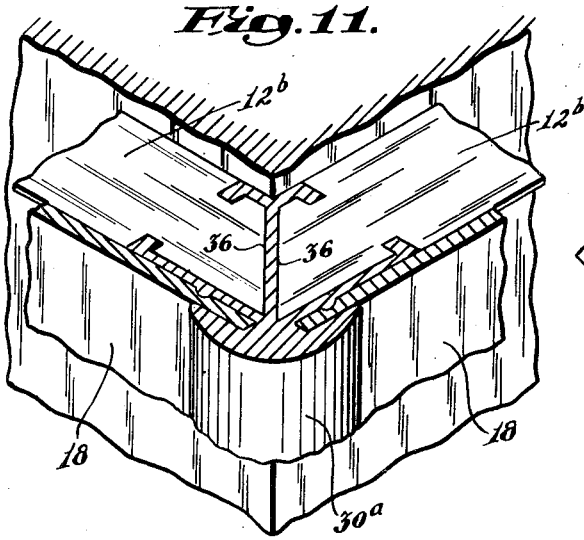
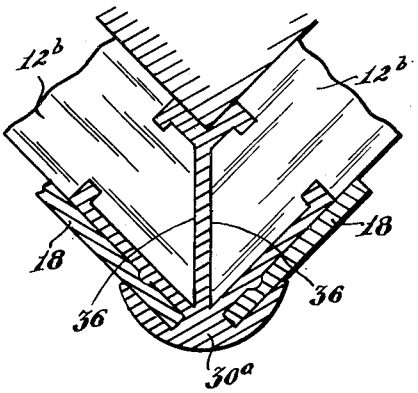
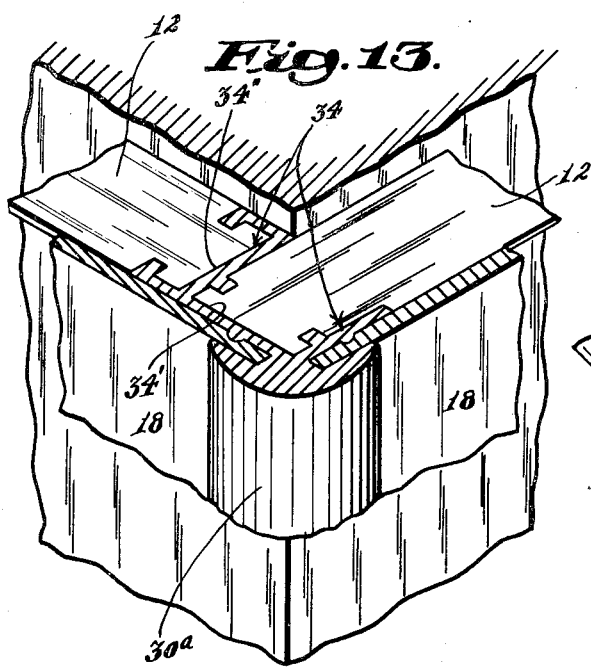
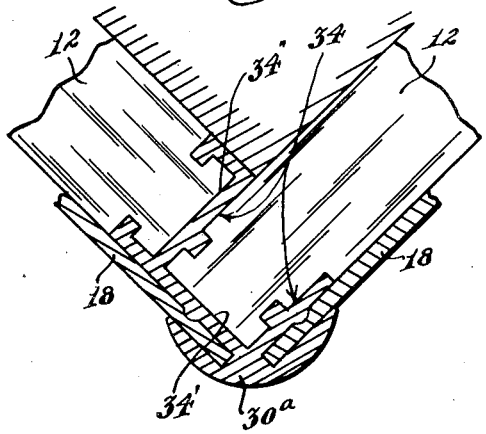
Inventor:
Robert R. Keller
by John H. McKenna
Attorney

United States Patent Office 2,728,957
Patented Jan. 3, 1956

2,728,957

MOULDINGS FOR PANEL MEMBERS AND THE LIKE

Robert R. Keller, Manchester, N. H.

Application June 3, 1953, Serial No. 359,380

7 Claims. (Cl. 20—15)

This invention relates to improvements in interlocking combined structural supports and moldings for panel members, and the like. More particularly it provides interlocking moldings which may be variously utilized as structural elements for counters, cabinets, tables, and the like, and which may be readily assembled to provide attractive and serviceable finished edges and surfaces which become inter-locked as a rigidly braced structural support for associated panels, and the like, with the moldings seating and gripping marginal portions of the panels. According to the invention, molding strips are designed to coact in oppositely disposed inter-connected pairs of molding strips, with the inter-connecting means extending rigidly between the oppositely disposed molding strips and inter-locking the strips against relative movement toward or from each other, and with the molding strips seating and gripping opposite edge margins of a panel, or the like, which rests in supported relation against the rigid strip-interconnecting means.

It is among the objects of the invention to provide panel-supporting structural moldings comprising rigidly inter-connected molding strips wherein the connection between the strips extends as one or more rigid panel-supporting member or members inter-locked with the moldings and maintaining a panel member, or the like, in marginally gripped supported relation between the molding strips. According to the invention, the rigidly inter-connected and inter-locked molding strips may extend at junctures of aligned panels, or at inside or outside corner regions of a panelled structure, or one of two inter-connected molding strips may provide a molding along one edge of a panel, or along one variety of juncture of a plurality of panels while the other of the inter-connected molding strips may provide a molding along a similar edge, or along a different variety of juncture of a plurality of panel members, or the like.

Another object of the invention is to provide panel-supporting structural moldings comprising oppositely disposed structural molding strips adapted to engage and grip opposite margins of a panel and locked on the panel by one or more rigid panel-supporting member or members which may be interlockingly arranged between the molding strips to lock the strips in place and to provide rigid support for the main area of the panel between the molding strips, the said rigid member or members co-operating with the molding strips to maintain and support the panel, or a like member, in a predetermined position.

A further object of the invention is to provide pairs of molding strips designed to inter-fit and inter-lock with end portions of a rigid panel-supporting member, or a plurality of such members, with the molding strips engaging opposite marginal portions of a panel, or the like, and with said panel-supporting member or members extending from molding strip to molding strip in rigid bracing relation to the panel, or a like member.

It is, moreover, my purpose and object generally to improve the structure and effectiveness of moldings for panel members and the like, and more especially of combined inter-locking moldings and panel supports which may be readily assembled in interlocked supporting relation to a panel member or a plurality of associated panel members.

In the accompanying drawings:

Fig. 1 is an isometric view, with portions broken away and portions in cross-section, of a panel member mounted and structurally supported by a combined molding and panel-supporting structure embodying features of the invention;

Fig. 2 is an isometric view of a fragment of one of the molding strips of the Fig. 1 structure;

Fig. 3 is an isometric view of one end fragment of a rigid connecting element which locks the molding strips of Fig. 1 on opposite edge margins of the panel member while contributing structural support for the panel member;

Fig. 4 is an isometric view, with portions broken away and portions in cross-section, illustrating an inside corner molding strip structure engaging two angularly related panel members, with a molding strip portion extending along the corner juncture of the panel members;

Fig. 5 is a cross-sectional plan view of the structure shown in Fig. 4;

Fig. 6 is an isometric view, with portions broken away and portions in cross-section, illustrating an outside corner molding strip structure engaging two angularly related panel members with a molding strip portion extending along the corner juncture of the panel members;

Fig. 7 is a cross-sectional plan view of the structure shown in Fig. 6;

Fig. 8 is an isometric view, with portions broken away and portions in cross-section, showing a molding strip structure at the edge juncture of aligned panels, with a molding strip portion extending along the juncture of the panels;

Fig. 9 is a cross-sectional plan view of the structure shown in Fig. 8;

Fig. 10 is a cross-sectional plan view of an inter-locked panel-supporting molding structure wherein a panel member extends between two spaced parallel walls, with a molding strip portion extending along each of opposite edge junctures of the panel with said walls;

Fig. 11 is an isometric view, with portions broken away and portions in cross-section, showing a modified form of outer corner molding strip structure which permits the rigid inter-locking of angularly related panel-supporting elements to engage the molding strip in a common plane;

Fig. 12 is a cross-sectional plan view of the structure shown in Fig. 11;

Fig. 13 is an isometric view, generally similar to Fig. 11 but showing another modified form of outer corner moulding strip structure, having the characteristics of the Figs. 11 and 12 structure; and Fig. 14 is a cross-sectional plan view of the structure shown in Fig. 13.

Referring to the drawings, and more particularly to Figs. 1–3 thereof, similar oppositely disposed moulding strips 10, 10 are secured in predetermined spaced and generally parallel relation by a plurality of relatively rigid interlocking elements 12 which extend in suitably spaced relation from one to the other of the moulding strips 10, 10. The moulding strips 10 may be made of aluminum, stainless steel, or other suitable material, and each has generally channel shape for reception in its channel 14 of end portions of the rigid interlocking elements 12 which may be of suitably rigid flat strip metal stock or, of any other suitably rigid material.

As represented in Figs. 1 and 2, each moulding strip 10 is designed to provide a substantial nosing at 16 along a marginal portion of a panel member 18 which panel member may serve as a table or counter top, for example, with the channels 14 below the panel member and open toward each other. The panel member 18 may be of any desired size and thickness, of plywood, natural wood, plastic board or any other stock conventionally employed or known to be suitable for panels. If desired, a backing sheet may be faced with linoleum, or the like, to provide a panel member 18.

The upper side wall 20 of each moulding strip channel 14 is relatively thick and is deeply grooved at 22 for reception therein of a marginal portion of the panel member 18, with the upper wall of the groove nicely curved exteriorly to constitute the nosing at 16, and with the lower wall of the groove preferably provided interiorly with a ridge at 24 which increases the pinching effect of the groove walls when a panel edge is forced into groove 22. Ridge 24 presses the seated panel margin tightly against the lip 16' of the nosing to avoid having an objectionable opening between this lip and the panel at the upper exposed side of the panel member 18.

The lower side wall 26 of each moulding strip channel 14 has an upwardly projecting flange 26' thereon, and the opposite upper side wall 20 has a depending rib 20' thereon opposite flange 26'. Each end portion of the interlocking elements 12 is oppositely notched at 12' a predetermined distance inward from the ends of the elements, and a notched end portion of an element 12 may be slid on edge into and along a moulding strip channel 14 with a flange 26' engaging in one edge notch 12' and with the opposite rib 20' engaging in the opposite notch 12' of the element 12.

When assembling the structure of Fig. 1, one moulding strip 10 is arranged along one margin of panel member 18 with the panel margin forced into the groove 22, and with the moulding strip channel 14 below the panel member. The other moulding strip 10 is arranged along the opposite margin of panel member 18, and this margin of the panel is forced into the groove 22, with the channel 14 disposed opposite the channel of the other moulding strip. Then the opposite notched end portions of an element 12, of predetermined length, are inserted on edge into open ends of the channels 14, with the channel wall flanges 26' and ribs 20' entering into interlocking engagement with the walls of notches 12' of element 12. The element 12 may be slid along the channels 14 to a desired location, after which one or more other elements 12 may be similarly inserted and slid to a selected position, or to selected positions, along the channels, whereby the moulding strips 10 become securely locked against spreading apart, and panel member 18 is securely held between the moulding strips with an attractive nosing at 16 along the opposite margins of the assembled structure.

However, it is a feature of the invention that each interlocking element 12 constitutes a rigid under-support for panel member 18 throughout the extent of the panel member between the two moulding strips 10, 10, at the location of each rigid element 12. The elements 12 have width whereby the upper edge of each element 12, when interlocked with the moulding strips, extends in the plane of the under surface of panel member 18 so that the panel rests thereon and is braced and supported by the rigid elements 12. The vertically disposed bottom walls of the channels 14 of the two moulding strips provide substantial opposite side edge surfaces for the assembled structure of Fig. 1, which may be mounted as a unit upon any suitable supporting structure.

Obviously, the moulding strips 10, 10 may have wider or narrower grooves 22 as may be required for accommodating panel members 10 of different thicknesses, and the interlocking elements 12 may be as long or as short as necessary for interlocking moulding strips along opposite margins of panel members of different widths.

Figs. 4 and 5 illustrate a modification of my interlocked panel-mounting structure in which two panel members 18, 18 are mounted in right-angular relation at an inside corner of a wall, or the like, with the juncture regions of the panels at the corner nicely and attractively finished by a moulding strip 30 which projects outwardly between the adjacent edges of the panel members 18 from an integral connection of strip 30 to a double-channel member indicated generally at 32. Member 32 has the two right-angularly related channels 14', 14' therein, each adapted to receive the notched ends of rigid elements 12 in the same manner as described in connection with Figs. 1 and 2, with the rigid elements 12 providing rigid support for the panels at suitably spaced locations, it being assumed that the other ends of the rigid elements 12 of Figs. 4 and 5 will be similarly interlocked at other inside corner locations, or at other edge junctures of panel members 18.

Outside corner junctures of panel members 18 may be provided as illustrated in Figs. 6 and 7 or as illustrated in Figs. 13 and 14. The embodiment of Figs. 6 and 7 requires a modified form of inter-locking rigid elements $12^a$ having a relatively large corner cut-out $12^b$ at each end of each element, and adjacent angularly related rigid elements $12^a$ must be located in different planes, with their end portions crossing each other in said different planes. Each reduced end of each rigid element $12^a$ is notched at $12^c$ for reception therein of a flange part $32^b$ of a modified double channel member $32^a$ having the inwardly projecting ribs $32^c$, $32^c$ thereon for engaging the edge of a rigid element $12^a$ which is opposite the edge with notch $12^c$ therein. As will be apparent from examination of Fig. 6, the upper one of the rigid elements $12^a$ slidably engages in one channel of channel member $32^a$ with its corner cut-out at $12^b$ accommodating the walls of the other channel of the channel member $32^a$. The lower right-angularly related rigid element $12^a$ slidably engages in said other channel of channel member $32^a$ with its corner cut-out at $12^b$ accommodating the walls of the first mentioned channel. A molding strip $30^a$ extends along the juncture of panel members 18 and is integrally connected to channel member $32^a$ between the adjacent ends of panel members 18.

A preferred outer corner panel-mounting structure is illustrated in Figs. 13 and 14 wherein the rigid elements 12 may be generally the same as illustrated in Figs. 1 and 3, and may be angularly related in a common plane, if desired. The moulding strip $30^a$ in Figs. 13 and 14 may be similar to that of Figs. 6 and 7 but the double channel member 34 has two right-angularly related open channels 34', 34'' of which the channel 34'' is to one side of channel 34' so that one rigid element 12 stops short of the other. The inter-locking of the rigid elements 12, 12 is effected in the same manner as described in connection with Figs. 1–5.

Still another variety of outer corner panel mounting structure is shown in Figs. 11 and 12, which involves a mitering of the ends of the rigid elements $12^b$ as at 36, and the double channel member 38 has the dividing wall 39 between the mitered ends of angularly related rigid elements $12^b$. The panel juncture moulding strip $30^a$ may be the same as in the Figs. 6 and 7 form.

Frequently it may be desirable or necessary to provide a juncture of edges of panel members 18 which are in a common plane, as when a single panel member is not large enough to extend from one corner support to another. Figs. 8 and 9 illustrate an interlocking panel-supporting structure for panel members 18 which come together in the same plane. The rigid inter-locking elements 12 may be the same as in the Figs. 1 and 3 embodiment, and the double channel member 38 has the dividing wall 39 which constitutes a bottom wall of each channel 40, 40, with the moulding strip 42 extending along the juncture of edges of the two panel members 18, 18 and integrally connected to wall 39 between the adjacent edges of the panel members. Obviously, the structure of Figs. 8 and 9 may be employed at horizontal or vertical junctures of panel members, and may be used also at panel junctures extending at angles to horizontal or vertical planes.

Fig. 10 illustrates still another modification of panel supporting structure wherein the panel member 18 extends between two parallel vertical walls 44, 46, with oppositely disposed channel members 48, 50 engaged flatwise against the walls with the channels open toward each other. Rigid elements 12, of suitable length, extend between the channel members with their end portions slidably inter-locked therewith as in the earlier described embodiments. Each channel member 48, 50 has a moulding strip 52 integral thereon and extending along each corner juncture of the panel with walls 44, 46. Obviously, the channel members and moulding strips, if desired, may extend in other planes than the illustrated vertical planes.

It will be apparent from the foregoing description, in connection with the drawings, that I have provided a panel-mounting and inter-locking panel-supporting structure which is readily adaptable for mounting and supporting panel members in various relative arrangements and with attractive mouldings along edges and junctures of the panel elements, and with rigid support for the panel elements. Various modifications may be made in the disclosed structures within the scope of the claims, and it is intended that the patent shall cover, by suitable expression in the appended claims, whatever features of patentable novelty exist in the invention disclosed.

I claim as my invention:

1. A panel-moulding structure comprising oppositely disposed channel-strips spaced substantially apart and having their channels open toward each other, similar walls of said channel-strips being relatively deeply grooved in general parallelism, with the entrances to the grooves open toward each other, a panel member extending between said channel-strips and having opposite end margins seated in said grooves, and a plurality of generally flat relatively rigid panel-supporting elements each having its opposite end portions slidably engaged in the channels of said channel-strips with a longitudinal edge thereof engaging said panel member throughout a substantial portion of the extent of each said element between said channel-strips, said generally flat panel-supporting elements being slidable along the channels of the channel-strips for supporting said panel member at selected locations between opposite edges thereof, and inter-locking means on said channel-strips and on said end portions of said elements coacting to secure said channel-strips in a predetermined spaced relationship.

2. A panel-moulding structure comprising oppositely disposed channel-strips spaced substantially apart and having their channels open toward each other, similar walls of said channel-strips being relatively deeply grooved in general parallelism, with the entrances to the grooves open toward each other, a panel member extending between said channel-strips and having opposite end margins seated in said grooves, and a plurality of generally flat relatively rigid panel-supporting elements each having its opposite end portions slidably engaged in the channels of said channel strips whereby the said elements may be moved along the channels of the channel-strips to selected locations between opposite edges of said panel member, each of said end portion of each of said elements having an edge-notch therein, and each said channel-strip having a projection thereon for inter-locking engagement in one of said notches whereby said channel-strips are maintained by said elements in a predetermined spaced relationship with a longitudinal edge of each said element in supporting relation to said panel member at locations between said channel-strips.

3. A panel-moulding and supporting structure comprising a first channel-strip having two angularly related channels therein, a second channel-strip in spaced relation to said first channel-strip and having a channel therein opposite and open toward the open side of one of said channels of said first channel-strip, a first panel member extending between said first and second channel-strips, a plurality of relatively rigid flat-strip elements having their opposite end portions slidably engaged in said channels of the first and second channel strips which are open toward each other, inter-locking means on walls of said channels in which said elements are engaged and on said end portions of said elements for maintaining said channel-strips in a predetermined spaced relationship, a third channel-strip in spaced relation to said first channel-strip and having a channel therein opposite and open toward the open side of the other of said channels of said first channel-strip, a second panel member extending between said first and third channel-strips, a plurality of relatively rigid flat-strip elements having their opposite end portions slidably engaged in said channels of said first and third channel-strips which are open toward each other, and interlocking means on walls of said channels in which the latter said elements are engaged and on said end portions of the latter said elements for maintaining said first and third channel-strips in a predetermined spaced relationship.

4. A panel-moulding and supporting structure comprising three channel-strips extending in general parallelism in spaced relation, one of said channel-strips having two angularly related channels therein each opposite and open toward a channel in a different one of the other channel-strips, two angularly related panel members each extending between two oppositely disposed channels and having edges extending in slightly spaced relation at one of said channel-strips, a moulding strip rigid on the latter, said one of the channel-strips and covering the said slightly spaced edges of the two panel members, and a plurality of relatively rigid flat-strip elements extending between said oppositely disposed channels of said channel-strips and having their opposite end portions slidably engaged in said channels, and inter-locking means on the walls of said channels and on said end portions of said elements for maintaining said channel-strips in predetremined spaced relationships.

5. A panel support and moulding comprising channel-strips extending in general parallelism at spaced locations, each said channel-strip having a channel opposite and open toward the open side of a channel of another of said channel-strips and a wall of each said channels being grooved with the longitudinal opening of each said groove opposite the similar opening of another similar groove, a panel member extending between opposite channels of different channel-strips and having opposite marginal portions seated in opposite ones of said grooves in the said different channel-strips, and a plurality of relatively rigid flat strip elements extending between said opposite channels and movable in directions along the channel-strips to selected locations between opposite edges of said panel member, there being means at the end portions of said elements locking said channel-strips in predetermined spaced relationships, each said strip element having an edge portion in engaged supporting relation to said panel member.

6. A combined nosing and apron for a panel member comprising a pair of channel-strips disposed in generally parallel spaced relation, a similar wall of the channel of each said channel-strip having a longitudinal groove therein open toward each other, a panel member extending between said channel-strips and having opposite edge margins thereof seated in said oppositely disposed grooves, and a plurality of rigid inter-locking means extending between said oppositely disposed channels and having their end portions slidably engaged in said channels for maintaining said channel-strips in a predetermined spaced relation, said interlocking means being slidable along the channel-strips to selected locations between opposite edges of said panel member and having substantial extent between said channel-strips in supporting engagement with said panel member at the said selected locations.

7. In a panel-moulding and panel-supporting structure, oppositely disposed channel-strips spaced substantially apart and having their channels open toward each other, a panel member supported by and extending between said channel-strips, and a plurality of rigid elements each having its opposite end portions slidably engaged in the channels of said channel-strips whereby the said elements may be moved along the channels of the channel-strips to selected locations between opposite edges of said panel member, each said end portion of each of said elements having an edge-notch therein, and each said channel-strip having a projections thereon for inter-locking engagement in one of said notches whereby said channel-strips are maintained by said elements in a predetermined spaced relationship with a longitudinal edge portion of each said element in supporting relation to said panel member at locations between said channel-strips.

References Cited in the file of this patent

UNITED STATES PATENTS

| | | |
|---|---|---|
| 2,154,749 | Hines | Apr. 18, 1939 |
| 2,227,150 | Olston | Dec. 31, 1940 |
| 2,484,283 | Gilbert et al. | Oct. 11, 1949 |
| 2,646,326 | Stanitz | July 21, 1953 |